H. G. REIST.
MEANS FOR PROTECTING SUBMERGED MOTORS.
APPLICATION FILED FEB. 14, 1907.
918,596.
Patented Apr. 20, 1909.
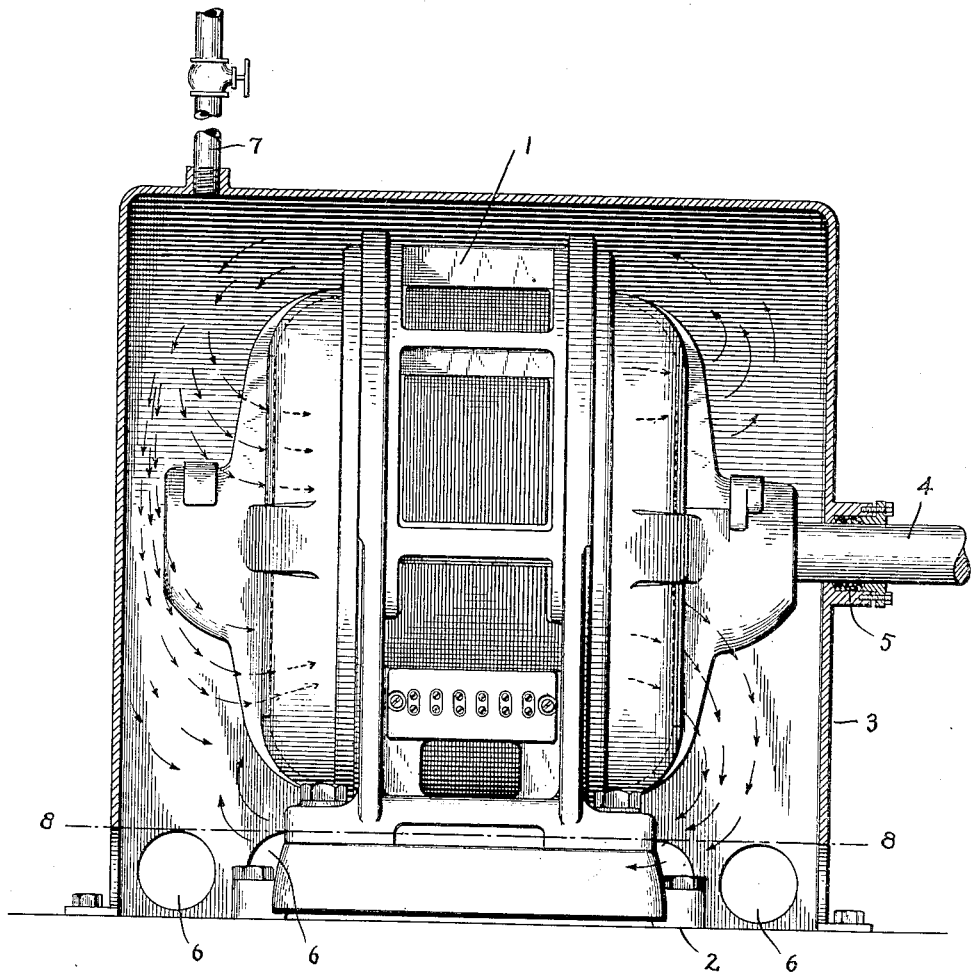
WITNESSES
W. Ray Taylor.
J. Ellis Glen.
INVENTOR
HENRY G. REIST.
by Albert H. Davis
Atty.

UNITED STATES PATENT OFFICE.

HENRY G. REIST, OF SCHENECTADY, NEW YORK, ASSIGNOR TO GENERAL ELECTRIC COMPANY, A CORPORATION OF NEW YORK.

MEANS FOR PROTECTING SUBMERGED MOTORS.

No. 918,596.　　　Specification of Letters Patent.　　Patented April 20, 1909.

Application filed February 14, 1907. Serial No. 357,267.

*To all whom it may concern:*

Be it known that I, HENRY G. REIST, a citizen of the United States, residing at Schenectady, county of Schenectady, State of New York, have invented certain new and useful Improvements in Means for Protecting Submerged Motors, of which the following is a specification.

It is frequently necessary to operate electric motors under water as, for example, in mines wherein the motors drive pumps for expelling water from the mines; and the present invention has for its object to make it possible to operate motors effectually under such conditions.

To the above end I provide such motors with air-tight casings which may be either casings which form the frames of the motors or separate casings which serve as diving bells for complete motors. The casings are provided with outlets at the bottom thereof and air inlets at the top. When the motors are installed, the casings may fill with water, but when it is desired to operate the motors, compressed air is forced into the casings so as to expel the water through the outlets at the bottom. The working parts of the motors are thus located in the medium consisting of compressed air and the freedom of operation is unimpeded. This air naturally circulates through the motors and serves to dissipate the heat generated therein. As the heated air leaves the working parts of the motors, it comes into contact with the cool walls of the diving bell and is in turn cooled so that it is again ready to pass through the motors and take up a further supply of heat.

The various features of novelty characterizing my invention will be hereinafter pointed out with particularity in the claims, but for a full understanding of my invention reference may be had to the accompanying drawing which shows partly in side elevation and partly in section a preferred embodiment.

In the modification illustrated, the diving bell is a separate element from the motor whereby the same diving bell may be used with any standard motor so arranged that its insulation will not be damaged by moisture. In its broader aspects, however, my invention contemplates any arrangements of parts whereby a diving bell effect is secured.

Referring to the drawing, 1 indicates an electric motor of any desired type. This motor is shown as fastened to a base 2 such as the floor of a mine or the surface which may become submerged.

3 is an air-tight, box-like casing which wholly surrounds the motor and is also secured to a fixed support such as the base upon which the motor rests. This casing may be made of sheet metal or it may be a casting. The shaft 4 of the motor, which is connected to the pump or other apparatus driven by the motor, passes out of the casing through a gland 5 which is arranged in any suitable way so as to make a tight joint about the shaft without interfering with the rotation of the shaft. Near the bottom of the casing are a number of openings 6 through which communication is established between the interior and the exterior of the casing. A pipe 7 is connected to and opens into the top of the casing, and through this pipe compressed air may be pumped into the casing.

Assuming that the motor and casing are wholly submerged and it is desired to start the motor, compressed air is introduced through the pipe 7 at such a pressure that the head of the water is overcome and the water is forced out of the casing through the openings at the bottom. The water recedes in the casing to a level slightly above the discharge openings as indicated by the dotted lines 8, 8, whereupon a state of equilibrium is established. The motor is now free to operate under substantially the same conditions as if it were located in the open air, and during this operation the air inclosed within the casing is drawn into and through the motor so as to come in contact with the heated surfaces of the working parts. Some of this heat is taken up by the air and is finally dissipated at the cool walls of the inclosing casing. The diving bell therefore not only acts as a protective shield against the surrounding water but it also serves as a cooling device for the motor and effectively prevents abnormal increase in temperature therein. It is, of course, unnecessary to have the casing absolutely air-tight, since any leakage, either through the gland or otherwise, may be compensated for by maintaining a corresponding continuous flow of air from the source of supply into the casing.

What I claim as new and desire to secure by Letters Patent of the United States, is,—

1. In combination, an electric motor, an air-tight inclosing casing therefor provided with an outlet near the bottom and a compressed air inlet, and a source of compressed air external to said casing arranged to force air into said inlet whereby the fluid in which the casing is submerged will not rise to a level in said casing much above said outlet.

2. In combination, an electric motor, an air-tight inclosing casing therefor provided with an outlet at the bottom thereof, a compressed air inlet at the top, and a source of compressed air external to said casing arranged to force air into said inlet whereby the fluid in which the casing is submerged will not rise to a level in said casing much above said outlet.

3. In combination, an electric motor having a shaft, an air-tight inclosing casing therefor, said motor shaft extending out of said casing through a tight bearing, said casing having an outlet below the windings of the motor and a compressed air inlet at the top, and a source of compressed air external to said casing arranged to force air into said inlet whereby the fluid in which the casing is submerged will not rise to a level in said casing much above said outlet.

In witness whereof, I have hereunto set my hand this 12th day of February, 1907.

HENRY G. REIST.

Witnesses:
  BENJAMIN B. HULL,
  HELEN ORFORD.